June 20, 1950     E. W. MARQUIS     2,511,929
COFFEE MAKER
Filed March 7, 1947
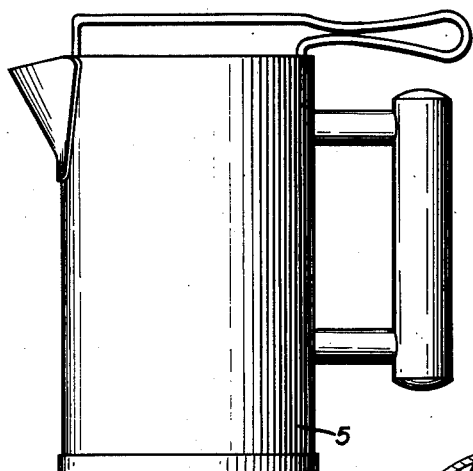
Fig. 1.
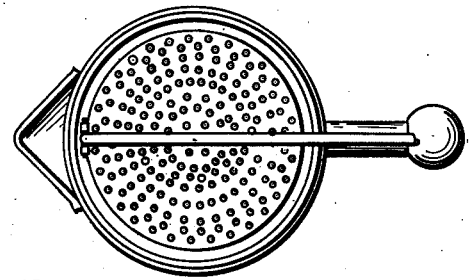
Fig. 3.
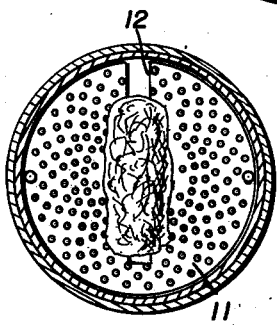
Fig. 4.
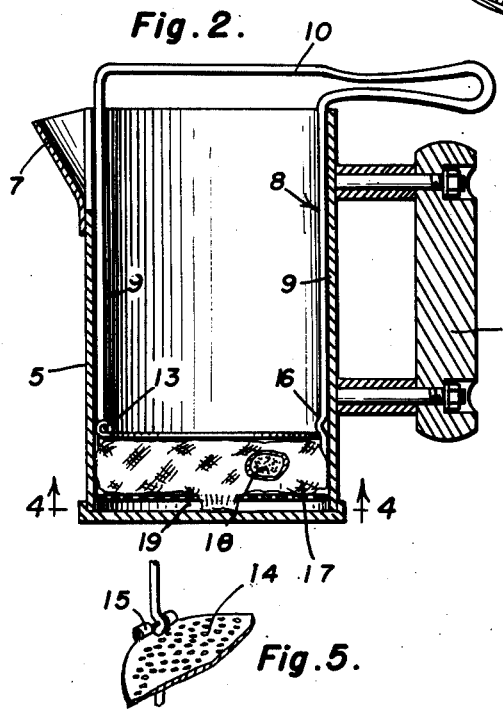
Fig. 2.
Fig. 5.
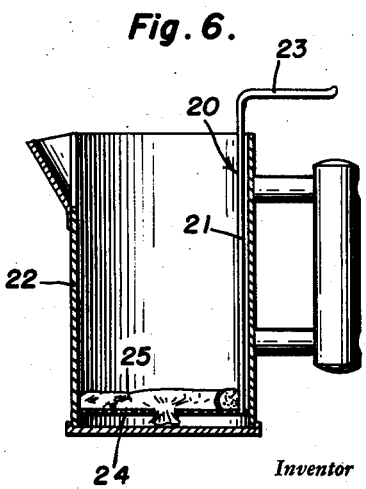
Fig. 6.
Inventor
Earl W. Marquis
By *Clarence A. O'Brien and Harvey B. Jacobson*
Attorneys Patented June 20, 1950

2,511,929

UNITED STATES PATENT OFFICE 2,511,929

COFFEE MAKER

Earl W. Marquis, Miami, Fla.

Application March 7, 1947, Serial No. 733,057

6 Claims. (Cl. 99—321)

The present invention relates to new and useful improvements in coffee makers and more particularly to a novel coffee pot construction wherein coffee may be made in a minimum of time.

More particularly the invention embodies the provision of a holder for a porous bag containing the ground coffee, the holder embodying means for compressing the bag into an expanded position against the sides of the coffee pot to function as a piston whereby vertical movement of the holder in the pot will cause the liquid therein to pass through the bag and circulate it through the coffee grounds to thus extract the flavor from the coffee in a relatively short period of time.

A further object of the invention is to provide means for easily and quickly securing the bag in position in the holder.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a vertical sectional view;

Figure 3 is a top plan view;

Figure 4 is a transverse sectional view taken on a line 4—4 of Figure 2;

Figure 5 is an enlarged fragmentary perspective view showing the hinge connection for the upper clamping plate for the coffee bag; and, Figure 6 is a vertical sectional view of a modified form of holder for the bag.

Referring now to the drawings in detail wherein for the purpose of illustration I have shown two selected forms of the invention, the numeral 5 designates a coffee pot of conventional construction and including a handle 6 and spout 7.

The present invention embodies a holder designated generally at 8 and which comprises a single strand of wire bent to provide a pair of spaced parallel legs 9 positioned vertically in the pot 5 at diametrically opposite sides thereof, the upper ends of the legs being bent horizontally and projecting outwardly at one side of the pot to form a handle 10.

The lower ends of the legs 9 are suitably secured adjacent the side edges of a perforated disc 11 having a slot 12 formed therein and extending inwardly from one edge of the disc radially substantially throughout the area of the disc.

One of the legs 9, at a point above the disc 11, is provided with a cross pin 13 forming a hinge pin to which one edge of an upper perforated disc 14 is pivotally secured by eyes 15 rolled at one edge of said last named disc. The opposite leg 9 is offset inwardly as shown at 16 to provide a yieldable catch under which the free edge of the disc 14 is engaged.

A porous bag 17 of suitable material is filled with a quantity of ground coffee 18 and the bag is inverted with its neck 19 inserted in the slot 12 to close the neck, the bag being moved into a position at the center of the disc 11.

The discs 11 and 14 are of a diameter slightly less than the internal diameter of the pot 5 and the bag 17 is of an area to cause an expansion of its sides by closing the upper disc 14 downwardly upon the bag in a manner to compress the latter so that the sides of the bag will project outwardly from the sides of the disc as shown in Figure 2 of the drawings to contact the sides of the pot 5.

With the bag 17 secured in position in the manner as indicated the pot 5 partially filled with water, the forcing of the bag 17 downwardly into the pot by the holder 8 will cause the water to circulate upwardly through the bag to thus extract the flavor of the coffee from the grounds 18.

The holder 8 may be moved upwardly and downwardly in the pot 5 the desired number of times until the coffee of a desired strength has been made in the pot and the holder 8 may then be removed from the pot and the bag 17 removed from the holder and discarded.

In the form of invention illustrated in Figure 6 of the drawings, the holder 20 comprises a single rod 21 positioned in the pot 22 and having its upper end bent horizontally to form a handle 23. A single perforated disc 24 is secured adjacent one edge to the lower end of the rod 21 and the coffee bag 25 is secured in inverted position to the disc in the manner as heretofore described.

In operating this form of the invention when the holder 21 is at the bottom of the pot and is pulled upwardly the pressure of the water will expand the bag 25 against the sides of the pot so that the water will pass through the bag to extract the flavor of the coffee therefrom.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A coffee maker comprising in combination, a pot adapted to hold water, a holder mounted in the pot for vertical movement therein, and including a flat horizontal member having an opening therein, and a porous coffee bag having a mouth engaged in and held in a closed position in said opening, said flat horizontal member and said coffee bag being substantially co-extensive and having a working fit in the pot to function as a plunger to force liquid in the pot through the bag.

2. A coffee maker comprising in combination, a pot adapted to hold water, a holder mounted in the pot for vertical movement therein, and including a flat horizontal member having openings therein and including a slot, and a porous coffee bag having a mouth engaged in and held in a closed position by said slot and supported on top of the member, said flat horizontal member and said coffee bag being substantially co-extensive and having a working fit in the pot to function as a plunger to force liquid in the pot through the bag.

3. A coffee maker comprising in combination, a pot adapted to hold water, a holder mounted in the pot for vertical movement therein, and including a flat horizontal member having openings therein and including a slot, and a porous coffee bag inverted on top of the member and having a mouth engaged in and held in a closed position by said slot, said flat horizontal member and said coffee bag being substantially co-extensive and having a working fit in the pot to function as a plunger to force liquid in the pot through the bag.

4. A bag hold for coffee makers comprising a leg portion and a handle portion, and a perforated plate carried by the leg and having a slot adapted for receiving the closed mouth of a coffee bag for attaching the bag to the plate, said plate and said coffee bag being substantially co-extensive and having a working fit in the pot to function as a plunger to force liquid in the pot through the bag.

5. A bag hold for coffee makers comprising a leg portion and a handle portion, a perforated plate carried by the leg and having a slot adapted for receiving the closed mouth of a coffee bag inverted on the plate, and a perforated clamping plate carried by the leg and movable into and out of clamping engagement with the bag to expand the bag beyond the edges of the plate.

6. A bag hold for coffee makers comprising a leg portion and a handle portion, a perforated plate carried by the leg and having a slot adapted for receiving the closed mouth of a coffee bag inverted on the plate, and means carried by the leg for compressing the bag on said plate into an expanded position to project beyond the edges of the plate.

EARL W. MARQUIS.

REFERENCES CITED

The following references are of record in the file of this patent:

UNITED STATES PATENTS

| Number | Name | Date |
|---|---|---|
| 204,099 | Schmitz | May 21, 1878 |
| 561,515 | Morian | June 2, 1896 |
| 1,002,376 | Doty | Sept. 5, 1911 |
| 1,313,582 | Cowan | Aug. 19, 1919 |
| 1,346,485 | Arrigunaga | July 13, 1920 |
| 1,686,283 | Levi | Oct. 2, 1928 |
| 1,947,523 | Hirschhorn | Feb. 20, 1934 |
| 1,982,846 | Wales | Dec. 4, 1934 |